United States Patent [19]
Nafziger et al.

[11] Patent Number: 5,904,745
[45] Date of Patent: May 18, 1999

[54] GENERATION OF SWEEPOUT MOTION PROFILE IN AN INDIVIDUAL SECTION GLASSWARE FORMING SYSTEM

[75] Inventors: Gregory W. Nafziger, Archbold, Ohio; Jeffrey P. Henning, Bethel Park, Pa.

[73] Assignee: Owens-Brockway Glass Container Inc., Toledo, Ohio

[21] Appl. No.: 08/858,748

[22] Filed: May 19, 1997

[51] Int. Cl.[6] .............................. C03B 9/00; G06F 19/00
[52] U.S. Cl. ........................... 65/29.1; 65/29.11; 65/160; 65/163; 65/260; 65/DIG. 13; 364/473.02
[58] Field of Search .................................. 65/29.1, 29.11, 65/160, 163, 260, DIG. 13; 364/473.01, 473.02

[56] References Cited

U.S. PATENT DOCUMENTS

| | | |
|---|---|---|
| Re. 29,642 | 5/1978 | Kwiatkowski et al. . |
| 3,419,373 | 12/1968 | Gould et al. . |
| 4,199,344 | 4/1980 | Mumford et al. . |
| 4,222,480 | 9/1980 | Perry . |
| 4,313,750 | 2/1982 | Lulejian et al. . |
| 4,364,764 | 12/1982 | Farkas et al. . |
| 4,409,013 | 10/1983 | Cardenas et al. . |
| 4,427,431 | 1/1984 | Mumford et al. . |
| 4,456,462 | 6/1984 | Jones et al. ............................... 65/163 |
| 4,486,843 | 12/1984 | Spongh et al. . |
| 4,529,429 | 7/1985 | Wood ....................................... 65/163 |
| 4,547,211 | 10/1985 | Ananias .................................... 65/163 |
| 4,548,637 | 10/1985 | Miller . |
| 4,551,163 | 11/1985 | Duga et al. . |
| 4,623,375 | 11/1986 | Cardenas-Franco et al. ............. 65/163 |
| 4,679,148 | 7/1987 | Wood ................................. 364/473.02 |
| 4,762,544 | 8/1988 | Davey . |
| 5,037,466 | 8/1991 | Voisine et al. . |
| 5,125,499 | 6/1992 | Saathoff et al. ........................... 65/163 |
| 5,160,015 | 11/1992 | Perry et al. . |
| 5,345,389 | 9/1994 | Calvin et al. ....................... 364/473.02 |
| 5,445,662 | 8/1995 | Peterson et al. . |
| 5,779,749 | 7/1998 | Nafziger ................................ 65/29.11 |

*Primary Examiner*—Steven P. Griffin

[57] ABSTRACT

In an individual section (IS) glassware forming system that includes a plurality of operating mechanisms for performing cyclic motions, an electronic controller for controlling cyclic motion of at least one of the operating mechanisms includes an electronic memory for storing a plurality of motion profiles for the one operating mechanism, with each of the profiles including a set of motion data versus time data. Each of the profiles has a piecewise linear contour determined by a plurality of control points, with each of the control points having associated motion and time data values. The operator may selectively display one of the profiles as a table of time values for the control points, with the time values preferably being in units of IS machine degrees. The operator may change the time values associated with one or more of the control points, and the controller automatically recomputes the motion data versus time data for the entire profile as a function of a change in time data by the operator at at least one of the control points, while maintaining the piecewise linear contour of the overall profile. Operation of the operating mechanism is thereafter controlled as a function of the recomputed motion versus time profile data.

20 Claims, 7 Drawing Sheets

TIME (MACHINE DEGREES) FIG.4C

TIME (MACHINE DEGREES)   FIG. 5C

MACHINE PARAMETERS

| | |
|---|---|
| NO. OF CAVITIES | 3 |
| NO. OF SECTIONS | 10 |
| MAXIMUM CAVITY RATE | 22.37 |
| WARE SPACING | 15.750 |
| SPEED FACTOR | 1.000 |

OK    CANCEL

FIG.6

REFERENCE COORDINATES

ENTER COORDINATES OF REFERENCE POINT

X  1.600
Y  12.813

OK
CANCEL

DIRECTION OF CONVEYOR ⟶

FIG.7

| DATA ENTRY | |
|---|---|
| TIME VALUES | |
| NODE A | 4.00 |
| NODE B | 31.99 |
| NODE C | 43.99 |
| NODE D | 50.99 |
| NODE X | 60.00 |
| NODE E | 64.00 |
| NODE F | 67.00 |
| NODE G | 72.00 |
| NODE H | 79.30 |
| SWEEP-OUT ANGLES | |
| MAX VELOCITY | 70.00 |
| MAX STROKE | 95.00 |

CLOSE  UPDATE  UNDO

FIG. 8

| DATA ENTRY | |
|---|---|
| TIME VALUES | |
| NODE A | 18.16 |
| NODE B | 48.00 |
| START CSM (C) | 68.57 |
| START DECEL (D) | 73.14 |
| DECEL FACTOR | 0.000 |
| MAX STROKE (F) | 85.53 |
| SWEEP-OUT ANGLES | |
| START CSM | 77.00 |
| START DECEL | 82.00 |
| MAX STROKE | 95.00 |

MODE: ● AUTO  ○ MAN.

UNDO  UPDATE  CLOSE

FIG. 9

| RETURN STROKE | |
|---|---|
| NODE R1 | 98.40 |
| NODE R2 | 124.71 |
| NODE R3 | 146.82 |
| NODE R4 | 168.94 |
| RETURN (R5) | 180.00 |

MODE: ● AUTO  ○ MAN.

UPDATE  CLOSE

GENERATION OF SWEEPOUT MOTION PROFILE IN AN INDIVIDUAL SECTION GLASSWARE FORMING SYSTEM

The present invention is directed to individual section (IS) machine glassware forming systems, and more particularly to a method and apparatus for generating and modifying the motion profile of the glassware sweepout mechanisms in such a system.

BACKGROUND AND OBJECTS OF THE INVENTION

The art of glass container manufacture is currently dominated by the so-called individual section or IS machine. Such machines include a plurality of separate or individual manufacturing sections, each of which has a multiplicity of operating mechanisms for converting one or more charges or gobs of molten glass into hollow glass containers and transferring the containers through successive stages of the machine section. In general, an IS machine system includes a glass source with a needle mechanism for controlling a stream of molten glass, a sheer mechanism for cutting the molten glass into individual gobs, and a gob distributor for distributing the individual gobs among the individual machine sections. Each machine section includes one or more parison molds in which a glass gob is initially formed in a blowing or pressing operation, one or more invert arms for transferring the parisons to blow molds in which the containers are blown to final form, tongs for removing the formed containers onto a deadplate, and a sweepout mechanism for transferring molded containers from the deadplate to a cross-conveyor. The conveyor receives containers from all sections of an IS machine, and conveys the containers to a loader for transfer to an annealing lehr. Operating mechanisms in each section also provide for closure of mold halves, movement of baffles and blowing nozzles, control of cooling wind, etc. U.S. Pat. No. 4,362,544 includes a background discussion of the art of both "blow and blow" and "press and blow" glassware forming processes, and also discusses an electropneumatic individual section machine adapted for use in either process.

The various operating mechanisms of the IS machine system were initially operated and synchronized with each other by means of a machine shaft, a multiplicity of individual cams rotatably carried by the shaft, and pneumatic valves responsive to the cams for selectively feeding air under pressure to the various operating mechanisms. The current trend in the art is toward replacement of the shaft, mechanical cams and pneumatic actuators with electric actuators responsive to drivers operated by so-called "electronic cams." These electronic cams take the form of motion profile information for the various operating mechanisms stored in electronic memory and selectively retrieved by electronic control circuitry for operating the electric actuators. Thus, such motions as forming and severing of the glass gobs, moving of the parisons and containers, opening and closing of the blow molds, in and out motions of the funnels, baffles and blow heads, and motions of the sweep-out and lehr-loading devices are accomplished electronically from motion profile information digitally stored in electronic memory, with motions at the various machine sections being synchronized with each other by common clock and reset signals. See U.S. Pat. No. 4,762,544.

In IS machine glassware forming systems that employ mechanical actuating cams on a machine shaft, adjustment of timing and motion profiles of the various operating mechanisms required adjustment or replacement of individual cams. In systems that employ electronic cams, it is often still necessary to stop the machine or machine section, change the motion profile electronically, and then restart the machine. For example, control techniques of the type disclosed in U.S. Pat. No. 4,548,637 typically require generation and storage of new profile data on an electronic read-only memory, often at a location remote from the manufacturing plant, and shut-down of the manufacturing system to permit installation of the memory in the control electronics.

It is a general object of the present invention to provide a system and method for selectively modifying the motion profile of an operating mechanism in a glassware forming system that may be easily implemented in a manufacturing environment with a minimum of operator training. A more specific object of the present invention is to provide a method and system for generating motion control profiles, particularly for controlling motion at the machine sweepout mechanisms, in which profile data can be readily changed, in which profile modifications are made off-line while the system is operating, which are user friendly, and which can be readily employed for creating and storing a library of motion control profiles that may be later selected for use by an operator. Another and yet more specific object of the present invention is to provide a method and system for generating motion control profiles for controlling motion at the sweepout mechanisms of an IS machine system by means of which plant personnel are allowed to select and/or modify the motion profiles to obtain optimum performance at each sweepout mechanism for a given set of bottle handling conditions, that allow such profile selection and/or modification on an immediate basis, in which a plurality of standard profiles may be selectively stored, and that operate by means of a Windows-based operating system.

SUMMARY OF THE INVENTION

In an individual section (IS) glassware forming system that includes a plurality of operating mechanisms for performing cyclic motions, an electronic control arrangement for controlling cyclic motion of at least one of the operating mechanisms in accordance with the present invention includes an electronic memory for storing a plurality of motion profiles for the one operating mechanism, with each of the profiles comprising a set of motion data versus time data. Each of the profiles has a predefined mathematical interrelationship among position, velocity and acceleration. One profile of motion versus time, preferably the acceleration profile, is defined by a piecewise linear curve—i.e., a curve of motion (preferably acceleration) versus time that consists of a series of linear line segments. A plurality of control points are defined at the intersections of successive piecewise linear segments. Each control point has associated motion and time values. The operator may selectively display one of the profiles as a table of time values for the control points, with the time values preferably being in units of IS machine degrees. The operator may change the time value associated with one (or more) of the control points, and the controller automatically recomputes the motion data versus time data for the entire profile as a function of the change in time data by the operator at the control points, while maintaining the piecewise linear contour of the overall profile. Operation of the operating mechanism is thereafter controlled as a function of the recomputed motion versus time profile data.

In the preferred embodiment of the invention, the profile of motion data versus time data is graphically displayed to the operator along with the tabular display of control point time data. The control points are individually identifiable to facilitate reference to the tabular display. After each operator change of the tabulated control point time data, the graphic display is automatically altered to reflect the recomputation of the motion profile data so as to illustrate to the operator the effect of the data change. If the change is deemed to be undesirable by the operator, the steps of altering and recomputing profile data may be selectively reversed by the operator so as to restore the profile data and graphic display to the condition prior to the preceding change. In the preferred embodiment of the invention, the graphic and/or tabular display and the operator control facility are implemented in a Windows-based graphic user interface, which can be readily learned and manipulated by an operator.

The preferred implementation of the method and system of the present invention is for selectively generating and modifying motion profiles for electronically operated sweepout mechanisms of an IS machine system. The profile data of motion versus time in such implementation preferably includes one or more profiles of acceleration versus time in piecewise linear contours. Each profile consists of a plurality of profile line segments, each extending between a sequential pair of control points, and each being defined by a separate equation, preferably a polynomial equation. The piecewise linear acceleration contours in the preferred embodiment of the invention include a four-level trapezoidal contour having four levels of constant acceleration, and a conveyor speed-matching contour that matches velocity of the glassware during sweepout to velocity of the cross-conveyor. (These piecewise linear acceleration contours, and the mathematical interrelationships to velocity and position, are known in and of themselves. The conveyor speed-matching acceleration profile has a short non-linear segment to match angular container speed to linear conveyor speed.) Multiple profiles of each of these piecewise linear contours may be generated and stored by selective manipulation of the control points between adjacent profile segments. Specifically, control point time data is selectively altered by the operator, and associated acceleration data is automatically computed according to the defined profile shape and predefined limit conditions, such as maximum velocity and stroke. Each motion profile includes an advance stroke during which the sweepout mechanism advances glassware from a section deadplate onto the cross-conveyor, and a return stroke during which the sweepout mechanism returns from the conveyor to the deadplate. The advance strokes are of differing contour according to the differing profile contours, whereas the return strokes are of identical contour in the preferred implementation of the invention.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
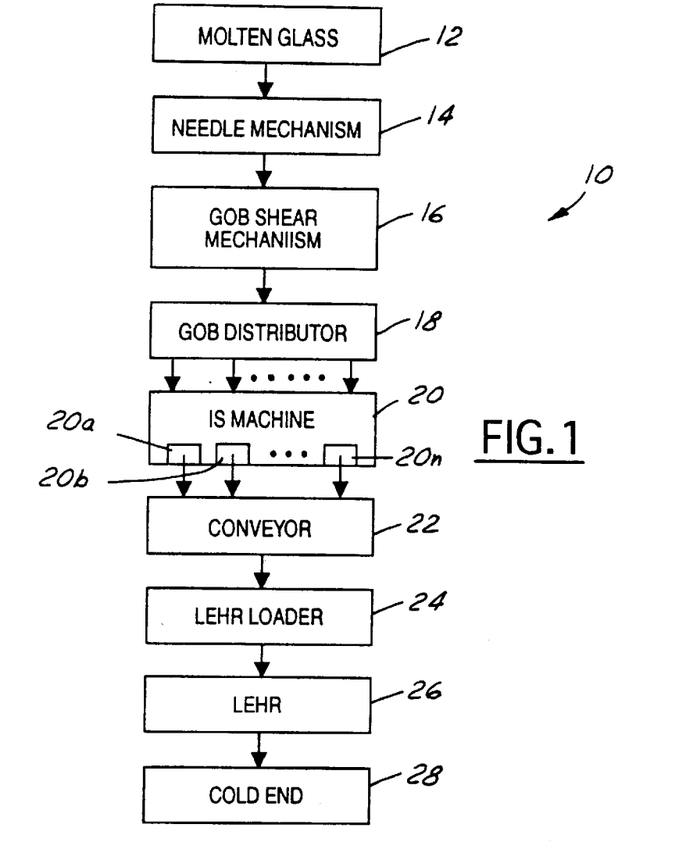
FIG. 1 is a functional block diagram of an individual section (IS) glassware forming system in which the present invention preferably is implemented.

FIG. 1 illustrates an IS machine glassware forming system 10 as comprising a reservoir or bowl 12 containing molten glass (from a forehearth) that is fed by a needle mechanism 14 to a shear mechanism 16. Shear mechanism 16 severs individual gobs of molten glass, which are fed by a gob distributor 18 to an IS machine 20. IS machine 20 includes a plurality of individual sections within which the gobs are formed into individual pieces of glassware. Each section terminates in a sweepout station 20a, 20b . . . 20n, from which the articles of glassware are delivered to a common cross-conveyor 22. Conveyor 22, usually an endless belt conveyor, delivers the containers in sequence to a lehr loader 24, which loads the containers in batches into an annealing lehr 26. The containers are delivered by lehr 26 to the so-called cold end 28 of the manufacturing cycle, at which the containers are inspected for commercial variations, sorted, labeled, packaged and/or stored for further processing.

System 10 illustrated in FIG. 1 includes a multiplicity of operating mechanisms for performing operations on the glass, moving glass workpieces through sequential steps of operation, and otherwise performing functions in the system. Such operating mechanisms include, for example, needle mechanism 14, gob shear mechanism 16, gob distributor 18, sweepout mechanisms 20a–20n and lehr loader 24. In addition, there are a multiplicity of operating mechanisms within each section of IS machine 20, such as mechanisms for opening and closing the molds, mechanisms for in and out motions of the funnels, baffles and blow heads, and mechanisms for motions of the invert arms and take-out tongs.

To the extent thus far described, IS machine glassware forming system 10 is of conventional construction. Reservoir 12 and needle mechanism 14 may be as shown, for example, in U.S. Pat. No. 3,419,373. In a currently preferred embodiment of the invention, needle mechanism 14 is as disclosed in U.S. application Ser. No. 08/597,760. Gob shear mechanism 16 may be as in U.S. Pat. Nos. 3,758,286 or 4,499,806, or more preferably as shown in U.S. application Ser. No. 08/322,121 filed Oct. 13, 1994 now U.S. Pat. No. 5,573,570. Gob distributor 18 may be as in U.S. Pat. No. 4,529,431 or 5,405,424. U.S. Pat. Nos. 4,362,544 and 4,427, 431 illustrate typical IS machines 20, and U.S. Pat. Nos. 4,199,344, 4,222,480 and 5,160,015 illustrate typical sweepout stations 20a–20n. U.S. Pat. Nos. 4,193,784, 4,290,517, 4,793,465 and 4,923,363 illustrate suitable lehr loaders 24. U.S. Pat. Nos. 4,141,711, 4,145,204, 4,338,116, 4,364,764, 4,459,146 and 4,762,544 illustrate various arrangements for electronic control of glassware manufacture in an IS machine system. A system for controlling motions of IS machine operating mechanisms is illustrated, for example, in above-noted U.S. Pat. No. 4,548,637. The disclosures of all U.S. patents and applications noted above are incorporated herein by reference for purposes of background.

Figure 2:
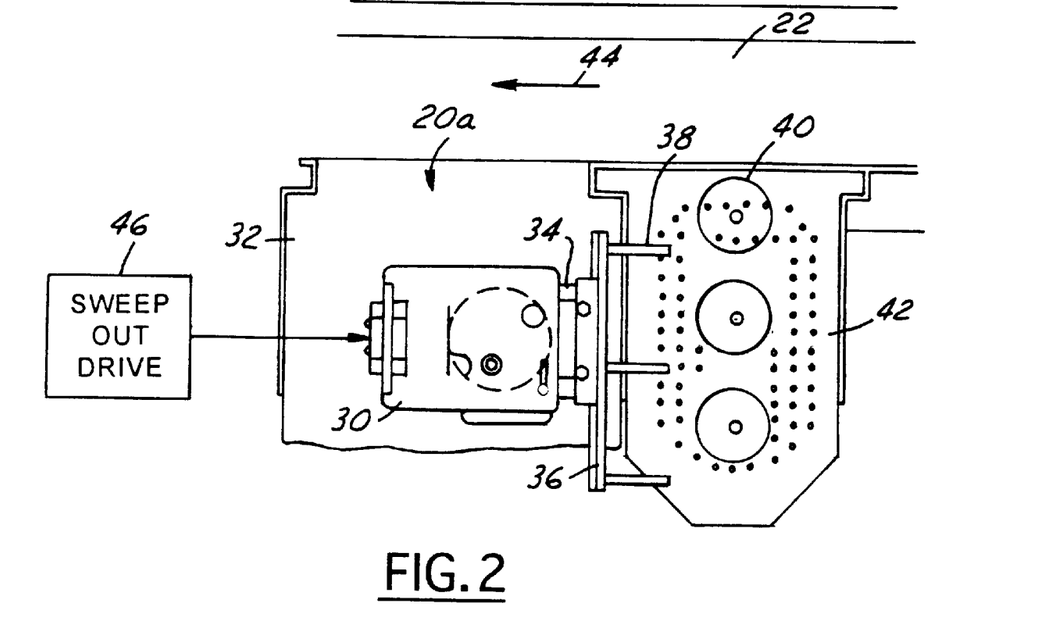
FIG. 2 is a schematic diagram of a machine section sweepout station for delivering glassware from a section deadplate to a machine cross-conveyor.

FIG. 2 illustrates sweepout mechanism 20a, mechanisms 20b–20n (FIG. 1) being identical thereto. Sweepout mechanism 20a includes a rotary servo actuator or motor 30 mounted for rotation to a fixed support frame 32. An arm 34 is extensible (by means not shown) outwardly from actuator 30. Arm 34 carries a hand 36 that has a plurality of fingers 38 for engaging glassware 40 placed by take-out tongs (not shown) on a machine section deadplate 42. The particular embodiment illustrated in FIG. 2 includes three fingers 38 for engaging three newly formed pieces of glassware 40 formed and placed on deadplate 42 by a so-called triple-gob machine section. With arm 34, hand 36 and fingers 38 extended laterally outwardly from the position illustrated in FIG. 2 so that fingers 38 are behind associated pieces of glassware 40, rotary actuator 30 is rotated counterclockwise so as to move glassware 40 onto cross-conveyor 22, with the latter continuously moving in the direction 44. Toward this end, actuator 30 is driven by a sweepout drive mechanism 46. After placing glassware 40 on conveyor 22, fingers 38, hand 36 and arm 34 are retracted, and actuator 30 is driven by sweepout drive 46 so as to rotate clockwise to the position shown for initiating the next sweepout cycle. It will be appreciated, of course, that this motion at sweepout 20a is repeated at the end of each cycle of the associated IS machine section, with operation of the various sweepouts 20a–20n (FIG. 1) being staggered in accordance with staggered operation of the associated machine sections and overall motion of conveyor 22.

Figure 3:
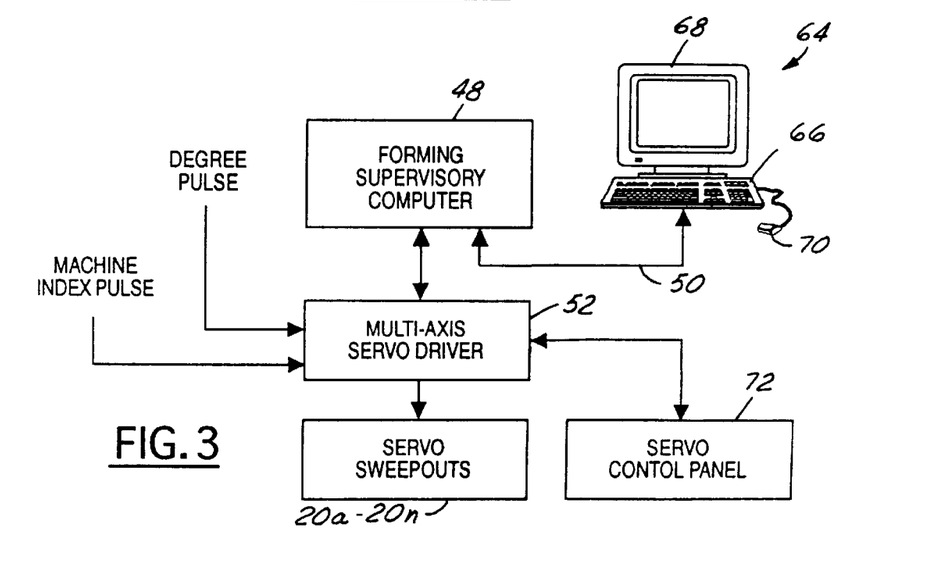
FIG. 3 is a functional block diagram of an electronic control arrangement for operating each sweepout mechanism in FIGS. 1 and 2.

FIG. 3 illustrates a portion of the IS machine operating system (see above-referenced U.S. Pat. No. 4,548,637) devoted specifically to operation of sweepout mechanisms 20a–20n. A forming supervisory computer 48 is connected by an ethernet system 50 to a multi-axis servo driver 52. Driver 52 also receives machine index pulses and degree pulses for synchronizing operation of all controlled mechanisms to operation of the overall forming system. Servo driver 52 contains microprocessor-based control circuitry and memory for receiving and storing profile and other control information from ethernet 50, and controlling operation at multiple mechanisms, including servo sweepouts 20a–20n. An operator console 64 includes a computer 66, with internal memory, an operator screen 68 and control device such as a mouse 70, connected to computer 48 and driver 52 by ethernet 50. Operator console 64 may comprise, for example, an IBM-compatible personal computer. Among other functions, operator console 64 provides facility for selectively changing operating mechanism control profiles at driver 52, as will be described. Driver 52 is also connected to an operator servo control panel 72, by means of which the operator can select the control profile to be used for each operating mechanism, and the starting point and/or total stroke for each section. For electronic sweepouts 20a–20n, a common profile is employed for all sections, and starting point but not total stroke may be set for each section.

The motion control profiles for the electronic servo sweepouts (as well as the other operating mechanisms) are preferably provided as a library of profiles prestored in memory within console 64. The library of prestored profiles may be selectively modified by the operator through operator console 64. Console 64 is preprogrammed (as will be described in detail) to generate motion profiles for the sweepout mechanism, and to allow the operator to design and modify such profiles so that sweepout motion can be optimized for improved delivery of glassware to conveyor 22 (FIGS. 1 and 2). Once a desired motion profile is set and downloaded into driver 52, driver 52 thereafter controls motion at sweepout mechanism 20, for example, as a function of the input machine index and degree pulses independently of computer 48 or console 64 (in the absence of intervention, of course). The profile data downloaded and stored in driver 52 may comprise a block or table of 1024 position versus time data elements in fractional degree increments, for example, for a position control mode of operation. Thus, although acceleration profile data is manipulated by the operator (as will be described), velocity and position profile data are also automatically calculated, and any one or more of these data blocks may be employed for control purposes in various modes of operation.

Figure 4A:
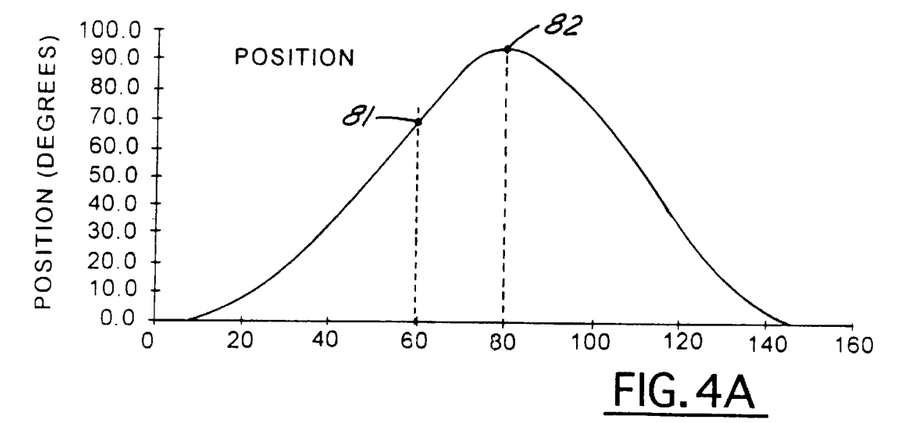
FIGS. 4A–4C are graphic illustrations of sweepout motion profiles in accordance with one preferred implementation of the invention.
Figure 4B:
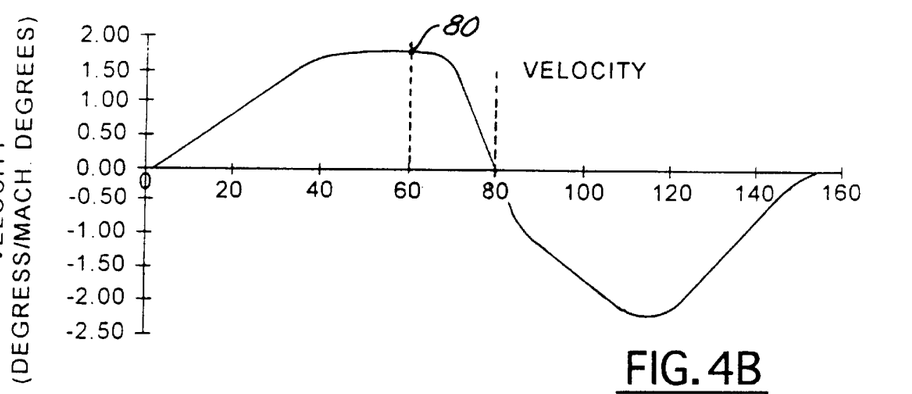
Figure 4C:
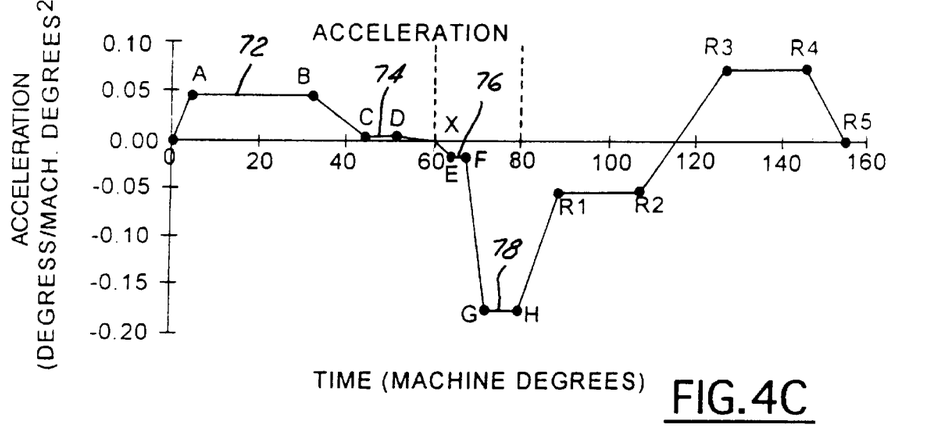
Figure 5A:
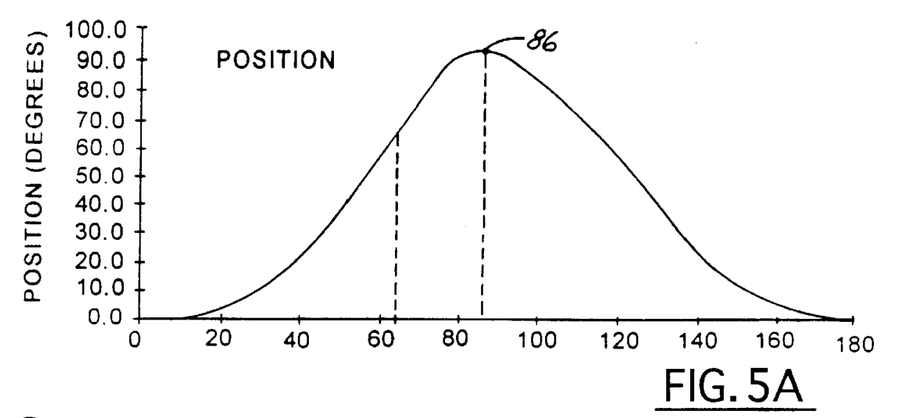
FIGS. 5A–5C are graphic illustrations of sweepout motion profiles in accordance with another preferred implementation of the invention.
Figure 5B:
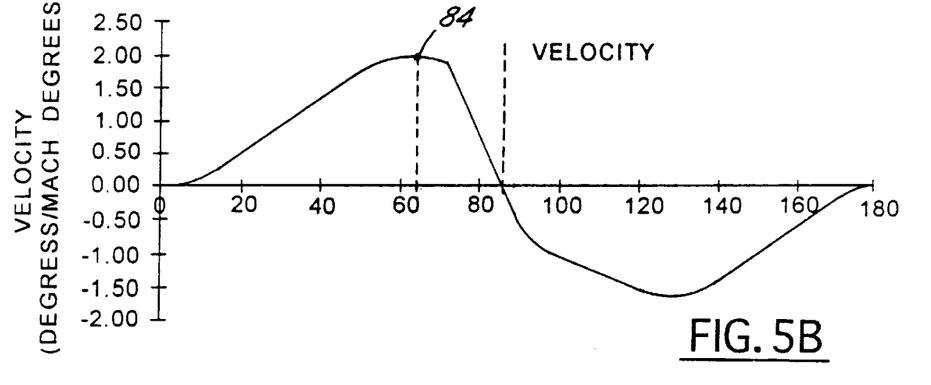
Figure 5C:
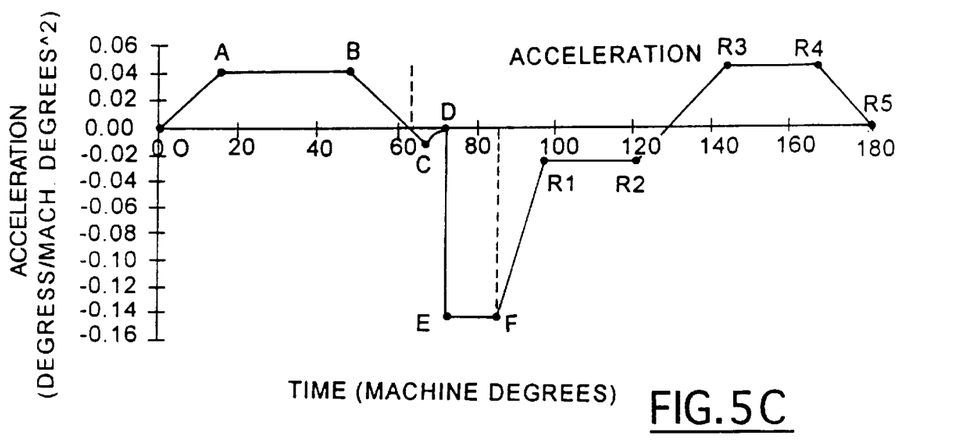

The preferred implementation of the present invention illustrated in the drawings is carried out using sweepout profiles of two basic contours. The first such profile contour, termed TRAP4 and illustrated in FIGS. 4A–4C, is based upon a four-level trapezoidal acceleration profile (FIG. 4C) during the advance stroke. The second such profile, termed CSM and illustrated in FIGS. 5A–5C, is based upon an attempt to obtain an exact match during the advance stroke of glassware speed to conveyor speed. Both techniques employ a trapezoidal piecewise linear acceleration profile, which means that acceleration, velocity and position are each defined by a series of polynomial equations. The two techniques differ in a small portion of the acceleration profile, during which the constant speed match or CSM technique matches the conveyor speed exactly for a prescribed sweepout angle. During this conveyor speed matching portion, the CSM technique employs an acceleration profile segment defined by a trigonometric equation. FIGS. 4A and 5A illustrate sweepout angular position in degrees versus time. FIGS. 4B and 5B illustrate sweepout angular velocity in angular degrees per unit time versus time. FIGS. 4C and 5C illustrate sweepout angular acceleration, in degrees per unit time squared versus time. In all cases, time is measured in units of operating degrees—i.e., degrees of motion for the operating mechanism in question as compared with a complete 360° cycle of the entered IS machine system. Since the sweepouts cycle once per machine cycle, the operating degrees for the sweepout mechanisms are the same as machine degrees, and are so illustrated in the drawings. In this way, the time axis does not vary with machine speed. The time increments could alternately be in units of real time.

Referring to FIG. 4C, the illustrated acceleration profile is defined by a plurality of control points, points O, A, B, C, D, X, E, F, G and H for the advance or outward stroke, and points R1, R2, R3, R4 and R5 for the return stroke. For the advance stroke of the sweepout mechanism, the TRAP4 acceleration profile (FIG. 4C) is characterized by four distinct levels (72, 74, 76, 78), between sequential control point pairs A-B, C-D, E-F and G-H, at which acceleration is constant. Each line segment O-A, A-B, B-C, C-D, D-X, X-E, E-F, F-G, G-H, H-R1, R1-R2, R2-R3, R3-R4 and R4-R5 is of constant slope, which is to say that the control points are defined to be the points between the piecewise linear segments of the acceleration profile. Each line segment corresponds to a separate polynomial equation for defining acceleration, velocity and position. The coefficients of these equations are calculated that acceleration, velocity and position are each equal at each control point or node between each sequential pair of line segments. The acceleration profile is manipulated (as will be described) by changing the time values (in machine degrees) for the control points. In addition, the maximum velocity and maximum stroke of the sweepout head are prespecified. None of the actual acceleration values can be specified. Nor can actual values for velocity and position, other than maximum values, be specified. All of these values are automatically determined by the profile generation programming within operator console 64 (FIG. 3).

The first control point O (FIG. 4C) at time zero cannot be changed. At this point, sweepout hand 36 (FIG. 2) is stationary over the deadplate. Therefore, acceleration, velocity and position values in the respective profiles are all zero. The first line segment O-A is the acceleration of the sweepout head (counterclockwise in FIG. 2) as glassware 40 starts to move across deadplate 42. This is one of the more critical regions of the profile. If the glassware is unstable at this point in the motion, it has a greater possibility of falling over on conveyor 22. The steeper the slope of line segment O-A in the acceleration diagram, the more rapidly the glassware is accelerated. In an extreme case, a rapidly changing acceleration will cause a jerky motion at the glassware. Therefore, this portion of the acceleration diagram should have a slope gently to accelerate the glassware from a standstill. The next line segment A-B is one of constant acceleration. This means that the angular velocity of the sweepout head is increasing linearly in time. For the profile of FIG. 4C, acceleration decreases over the next line segment B-C. However, the acceleration can either decrease, remain the same or increase over this line segment—i.e., between control points B and C. Line segment C-D is another region of constant acceleration, followed by an interval of decreasing acceleration in line segment D-X. Up to control point or node X, velocity has increased at various rates. The two levels 72, 74 of constant acceleration can be manipulated (by varying the time values of the control points) to control the shape of the velocity curve (FIG. 4B) up to the point 80 of maximum velocity.

Control point or node X is always the point at which maximum velocity occurs (at point 80 in FIG. 4B). The value of acceleration at control point X is fixed at zero, and cannot be changed. Time of occurrence of control point X, magnitude of maximum speed 80, and positions 81, 82 of the sweepout head need to be specified by the operator. (See the later discussion of FIGS. 8 and 11.) Line segments X-E, E-F, F-G and G-H are two constant acceleration segments (E-F and G-H) and two line segments (X-E and F-G) in which acceleration is allowed to change. All of these line segments and control points (except X) are in the region of negative acceleration, which means that the sweepout head is slowing down. Retraction of hand 36 (FIG. 2) is usually set to occur soon after the start of rapid deceleration. This may be at control point X or control point F, depending on the profile. Retraction usually must be set by eye with the machine running. Control point H corresponds to maximum angle of the sweepout head, point 82 in FIG. 4A. Maximum angle is usually set at 95°. At full stroke, the sweepout head stops for an instant and reverses direction, so velocity is zero at this point.

The conveyor speed match or CSM control technique is illustrated in FIGS. 5A–5C. This technique allows a particular piece of glassware exactly to match the conveyor speed at a specified sweepout angle. This technique minimizes dependence upon frictional characteristics between the glassware and the belt. The desired effect is to place the glassware on the belt by exactly matching the speed of the conveyor, and then backing away from the glassware with the sweepout fingers. In multiple-gob machine sections, an exact match can only be obtained with one glassware element. It will also be noted in connection with FIG. 5C that the CSM profile technique has fewer nodes or control points in the acceleration diagram, making it easier to modify control profiles. Exemplary position, velocity and acceleration profiles for the CSM technique are illustrated in FIGS. 5A–5C. Once again, the acceleration profile (FIG. 5C) is defined by a plurality of control points O, A, B, C, D, E, F, R1, R2, R3, R4, R5, at each of which the acceleration profile changes slope. The first part of the outward or advance stroke is very similar to the TRAP4 technique discussed above. Line segment O-A should not be to steeply inclined, or the glassware can become unstable as it is accelerated from standstill along the deadplate surface. The next line segment A-B is of constant acceleration (linearly increasing velocity), followed by line segment B-C in which acceleration is linearly decreasing.

The next line segment C-D is the conveyor speed match segment. This line segment is defined by a trigonometric equation, rather than a polynomial equation as with the rest of FIG. 5C and all of FIG. 4C, because the angular velocity of the sweepout head is related trigonometrically to the linear velocity of the cross-conveyor. This is the only line segment in FIG. 4C and 5C that is not strictly linear. The shape of segment C-D is dependent upon the velocity of the cross-conveyor (which depends on the number of sections and the ware spacing), the glassware element or point that is to be matched to the conveyor speed, and the sweepout angles where the conveyor speed match should start and end. It has been found that the duration of conveyor speed-match should be in the range of five degrees to ten degrees of sweepout head rotation. At control point or node D, rapid deceleration begins. Deceleration should typically be as rapid as possible so that the glassware will be carried by the conveyor away from the fingers before finger and hand retraction occurs. However, if desired, line segment D-E can be given some slope so that deceleration is not too abrupt. Line segment E-F is the last line segment of the advance stroke. At control point F, the sweepout head is at maximum angle (preferably ninety-five degrees), and the velocity is zero. Points 84, 86 and associated dashed lines indicate the points of maximum velocity and maximum stroke.

The return stroke contour is the same for both the TRAP4 and CSM techniques. It is the least critical portion of the profile since the sweepout basket (hand 36 and fingers 38) is in the retracted position and not in contact with the glassware. The return stroke profile is trapezoidal, as shown in both FIGS. 4C and 5C. Although modifications can be made to the return stroke by changing the time values of control points R1, R2, R3 and R4 as will be described, this is usually not necessary as long as the sweepout head returns smoothly to the deadplate within the required time. Most preferably, the time between each control point is proportioned evenly based on the time between the last control point (H in FIG. 4C and F in FIG. 5C) of the outward stroke and the maximum time available. Control point R5 at one hundred eighty machine degrees (in FIG. 5C) has an amplitude of zero, corresponding to zero velocity and zero position (FIGS. 5B and 5A). The shapes of the return stroke profiles in FIGS. 4C and 5C are generally the same.

In summary, each of the acceleration profiles of FIGS. 4C and 5C is defined by a plurality of control points between piecewise linear profile segments, and therefore the equations for acceleration, velocity and distance change at each control point. The profile data actually employed for control of the sweepout servo actuator can be any or all of the position, velocity and acceleration profiles in position, velocity or acceleration control modes of operation, or any combination thereof. For example, the position profile (FIG. 4A or 5A) stored in memory may be a data set consisting of a multiplicity of position versus time data elements or points—e.g., position versus time elements to define the profile in memory, one for each machine degree increment. For purposes or editing or modifying the profile, however, the acceleration profile is employed, which is defined by a lesser number of control points between piecewise linear profile segments. The corresponding equations for determining the velocity and position data points are either first, second or third order polynomial equations (except for the line segment C-D in FIG. 5C). Thus, for example, the polynomial equation for velosegmeduring the machine degree time period corresponding to line segment O-A in FIG. 5C is a second order polynomial equation, and the corresponding equation for position is a third order polynomial equation. In the same manner, the polynomial equation for determining velocity during the time in machine degrees corresponding to acceleration line segment A-B is a first order polynomial equation, and the equation for determining position is a second order polynomial equation. The coefficients for each of these separate equations are calculated so that the accelerations, velocities and positions are equal at the node or control point between successive profile line segments.

Figure 7:
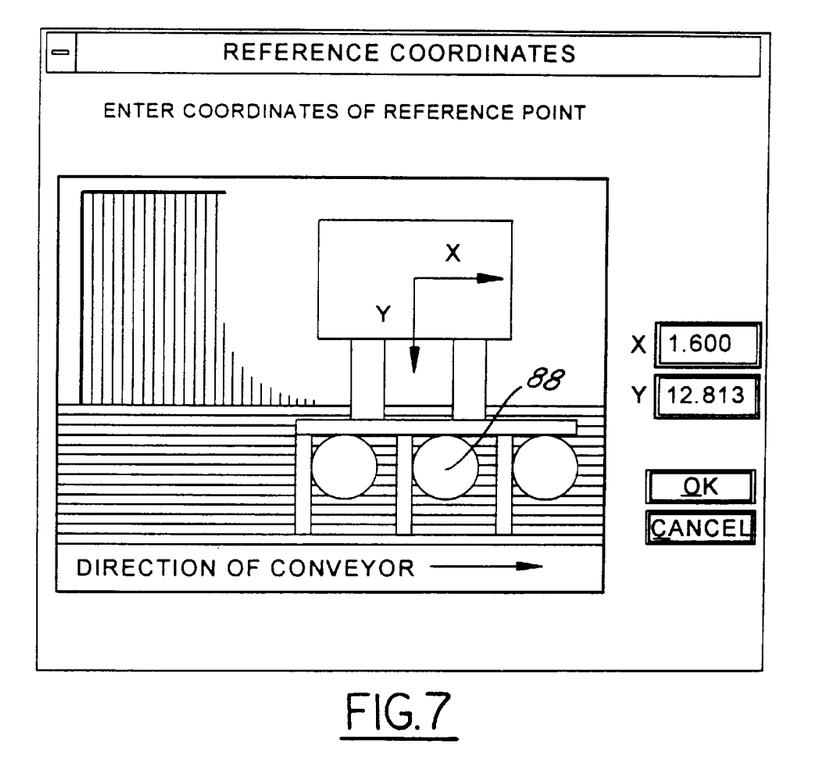
FIG. 7 is a Windows-type graphic/tabular display for setting sweepout reference coordinates in accordance with the preferred embodiment of the invention.

Before profiles may be generated or modified employing the techniques to be discussed in connection with FIGS. 6–10, reference coordinates are input, by means of the graphic/tabular dialog box illustrated in FIG. 7, to facilitate conversion of angular coordinates to linear coordinates. (This conversion is necessary because the sweepout basket is moving in an arc, while the conveyor is moving in a straight line.) For CSM profiles, the specified reference point is matched to conveyor speed. The coordinates of the center 88 of the second glassware element has been successfully employed. Under certain conditions, another glassware piece, or even a point between two glassware elements, may produce better results. For TRAP4 profiles, the reference point is used for the calculation of maximum velocity 84 (FIG. 5B) by the software in console 64 (FIG. 3). The coordinates are entered relative to the axis of rotation of the sweepout head, as illustrated in FIG. 7. When the sweepout head is positioned at right angles to the conveyor as shown, the positive "y" direction is from the axis across the conveyor, and the positive "x" direction is in the same direction that the conveyor is moving.

Figure 6:
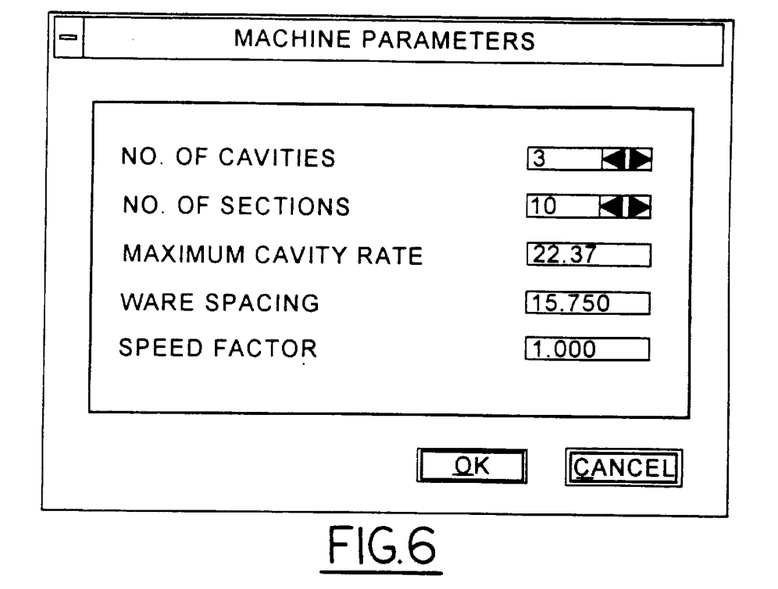
FIG. 6 is a Windows-type tabular display for setting machine operating parameters in accordance with the preferred embodiment of the invention.
Figure 11:
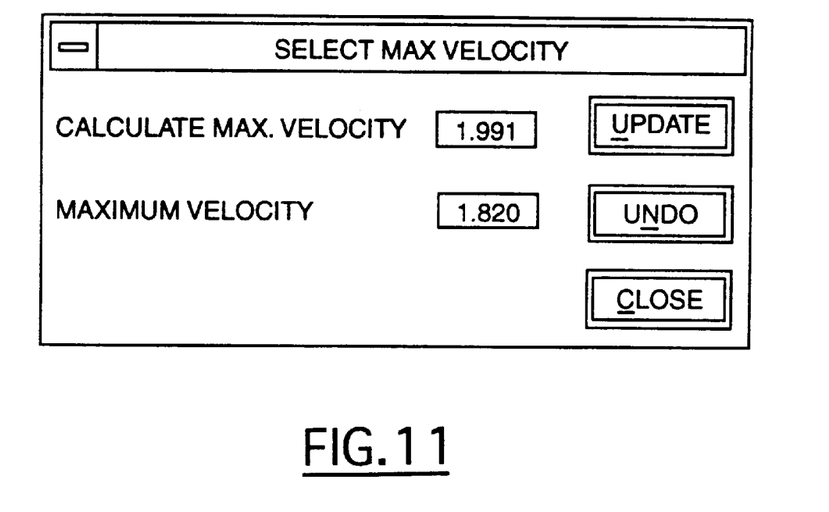
FIG. 11 is a Windows-type tubular display for setting maximum sweepout velocity.

Certain limiting conditions or parameters must then be set. For example, maximum angular velocity for a TRAP4 profile (point 80 in FIG. 4B) must be set, for the purpose of which the dialog box of FIG. 11 is called. The programming within console 64 calculates and displays a calculated maximum velocity as the angular velocity of the reference point selected in conjunction with FIG. 7 (e.g., point 88 in FIG. 7) to match the linear velocity of cross-conveyor 22. This value is displayed—e.g., the value of 1.991 in FIG. 11. Using this calculated figure as a guide, the operator then enters a desired maximum velocity—e.g. 1.820 in FIG. 11. Maximum selectable velocity is 110% of the calculated maximum velocity. This figure is then used by the console programming for calculation of equation coefficients. Similarly, maximum velocity 84 in FIG. 5B is set according to velocity of the cross-conveyor and the reference point selected in conjunction with FIG. 7. Machine set-up parameters are entered by calling up the dialog box illustrated in FIG. 6 (either through manipulation of mouse 70 in FIG. 3 or appropriate strokes on keyboard 68). The number of cavities per section (three in the exemplary triple-gob implementation), the total number of sections in the machine, the maximum cavity rate, the ware spacing and a speed scaling factor are input to console 64 (FIG. 3). The number of sections and the ware spacing are employed by the programming within console 64 to determine the speed of cross-conveyor 22 (FIGS. 1 and 2), which in turn sets maximum velocity 84 (FIG. 5B). The speed factor is a scaling factor that can be used to scale the maximum speed of a CSM profile. The speed factor input is not available when a TRAP4 profile is being edited. Instead, TRAP4 profiles can be scaled in time and maximum velocities separately.

Figure 8:
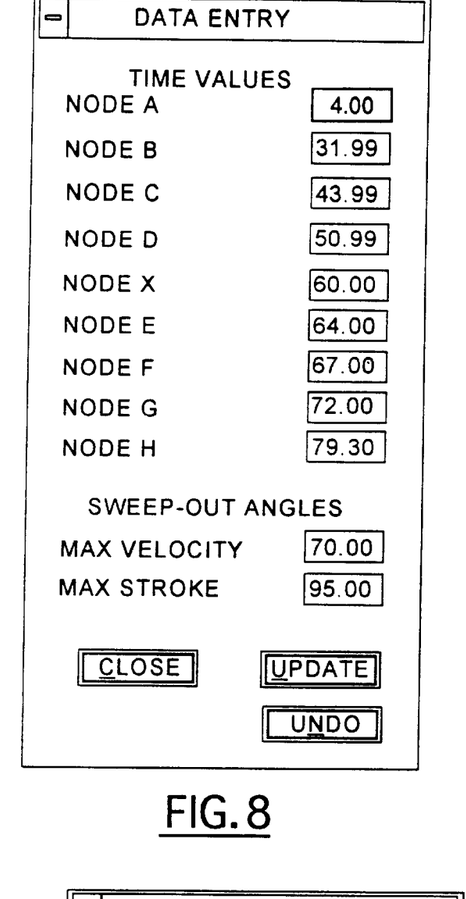
FIGS. 8 and 9 are Windows-type tabular displays for setting control point time values for two differing advance profile contours in accordance with the preferred embodiment of the invention.

Following these preliminary set-up steps, prestored profiles may be edited or new profiles generated. To edit the TRAP4 acceleration profile illustrated in FIG. 4C, for example, the dialog box illustrated in FIG. 8 is called onto the screen, preferably together with a graphic background display of the acceleration profile as in FIG. 4C, or graphic background displays of the position, velocity and acceleration profiles as in FIGS. 4A–4C. The dialog box in FIG. 8 contains a table of the time values (in machine degrees) of each of the control points or nodes A, B, C, D, X, E, F, G, H that can be varied by the operator for modifying the sweepout advance stroke. There are also boxes for display and possible modification of position or angle of the sweepout head at the points of maximum velocity (position 81 in FIG. 4A) and maximum stroke (position 82 in FIG. 4A). The time values and sweepout-angles of the various control points or nodes in FIG. 8 correspond to the graphic illustration of FIGS. 4A and 4C. Any of these time and angle values may be selectively changed by the operator by selecting a particular box for modification employing mouse 70 (FIG. 3) and a screen cursor (not shown), so that the box is highlighted. When a table box is selected and highlighted, the corresponding control point in the graphic display (FIG. 4C) is also highlighted, such as by placing a box around the selected control point. This assists the operator in relating the dialog box table (FIG. 8) to the graphic display (FIG. 4C). A new numeric time value may then be entered by the operator. Internal programming within operator counsel 64 automatically alters the acceleration, velocity and position profiles according to the newly entered time value(s) for the selected node(s), based upon the predetermined polynomial equations, maximum velocity value 80 (FIG. 4B) calculated from the inputs and stroke values (FIG. 8), and the corresponding changes in the acceleration, velocity and position graphic profiles are made on display screen 66 for operator observation. If the observed effects on the graphic profile display are not as desired, the operator may return to the previous profile by "clicking" on the "undo" box in FIG. 8, or depressing key "n." This "undo" process may be repeated, if desired, to return to the profile originally called from memory and displayed to the operator.

Figure 12:
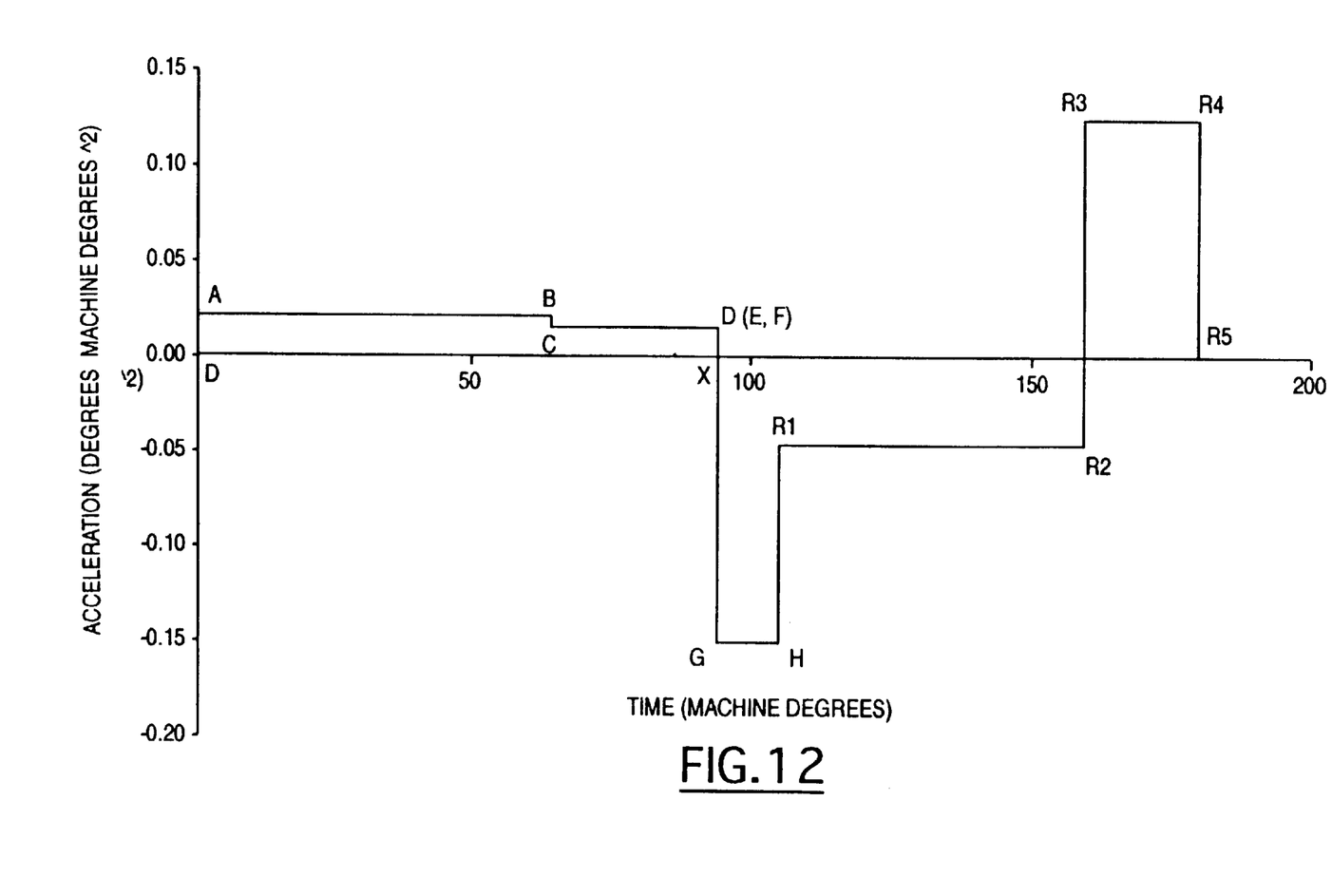
FIGS. 12 is a graphic illustration of a modification to FIG. 4C.

As an example, FIG. 12 illustrates a modification to FIG. 4C that would result from setting in FIG. 8 the time value of control point A at zero, the time values of control points B and C the same at about 65°, the time values of control points D, E, F and G the same at about 92°, the time values of control points H and R1 the same at about 105°, the time values of control points R2 and R3 the same at about 160°, and the time values of control points R4 and R5 the same at about 180°. (Note that flat line segment 76 in FIG. 4C has disappeared.) The acceleration profile of FIG. 12 would probably be unsatisfactory because of excessive jerk at line segments O-A, D-X-G, H-R1, R2-R3 and R4-R5.

Figure 9:
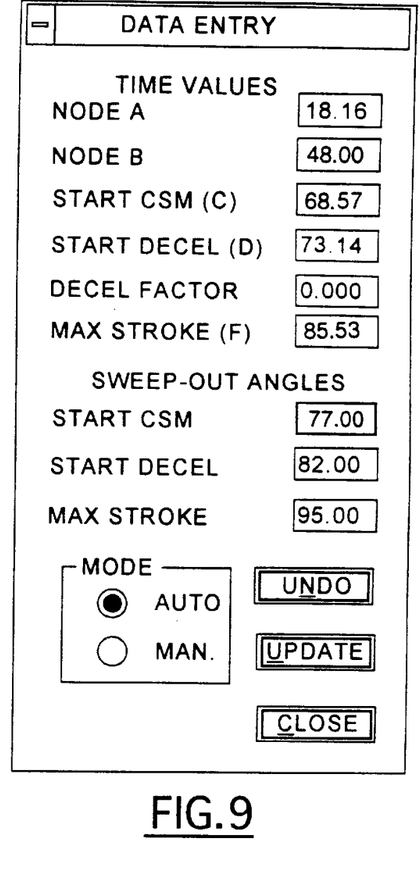

FIG. 9 illustrates a dialog box or table for selectively modifying the advance stroke of a CSM acceleration profile (FIG. 5C). Once again, current time values (in machine degrees) for each changeable control point or node A, B, C, D and F are displayed, together with the desired deceleration factor between control points D and E. The value of this deceleration factor, which is between zero and one, determines the distance to where node E is located along line segment EF. If the decel factor is zero, line segment D-E is vertical as shown, while control points E and F will coincide if the deceleration factor is "1.0." Also selectable in FIG. 9 are the sweepout head angle or position at which conveyor speed matching is to start ("77.00" degrees in FIG. 9), the sweepout head angle at which deceleration is to start ("82.00" degrees in FIG. 9) and the sweepout head angle of maximum stroke 86 ("95.00" degrees in FIGS. 5A AND 9). Once again, changes can be undone, updated or the profile closed by "clicking" on the corresponding box in FIG. 9. Selections of "auto" and manual modes of operation are also available in FIG. 9. The automatic mode of operation, if selected, will result in automatic calculation of all node time values and changes in displayed graphics. This will usually provide a good starting profile, which can be tailored by "clicking" on the manual mode selector and fine tuning the time and/or angle values.

Figure 10:
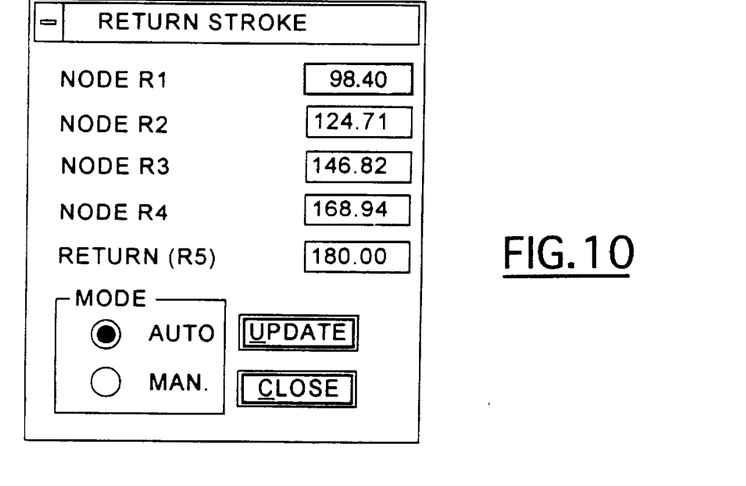
FIG. 10 is a Windows-type tabular display for setting return stroke time values in accordance with the preferred embodiment of the invention.

The return stroke dialog box is illustrated in FIG. 10. The "auto button" may normally be employed for automatic calculation of time values of the return stroke control points as previously indicated. Alternatively, time values for return stroke control points R1, R2, R3, R4 and R5 can be varied.

After a profile has been designed or optimized as desired, it may be stored in memory in console 64 and/or driver 52, together with a name or other suitable indicia for later identification and recall. There may thus be developed a library of profiles for later use and/or modification. The library would typically include basic profiles that cannot be changed, and other profiles that can be changed. Design of a new profile would normally start with call-up of an existing profile known by the operator to be basically similar to that desired, followed by modification to obtain desired operating characteristics. This new profile would then be stored in memory under a new name.

There has therefore been provided a system and method for generating and/or modifying motion profiles in an individual section glassware forming system, particularly as related to electronically controlled glassware sweepout operating mechanisms, that fully satisfy all of the objects and aims previously set forth. In particular, the system and method of the invention allow plant personnel to select, modify or generate motion profiles to obtain optimum performance at the sweepout mechanism for a given set of glassware handling conditions on an immediate basis. The profile generation/modification program most preferably is a Windows (trademark of Microsoft, Inc.) based program that is easy to learn and use. Passwords may be employed to screen operator access. Various menus and other commands may be employed for various functions as deemed appropriate. Preferably, both TRAP4 and CSM profiles are electronically stored and available for modification and/or use as operating conditions dictate. The operator may readily tailor the control profile to operating conditions at each machine section.

The invention has been described in connection with operator modification to acceleration profiles, which is currently preferred. However, velocity and/or position profile could also be edited employing the disclosed techniques. In the same way, the TRAP4 and CSM acceleration profiles are employed in purposes of disclosing an exemplary presently preferred embodiment of the invention. The invention may be readily applied to other acceleration (or velocity position) profile techniques.

We claim:

1. A method of controlling motion of an operating mechanism in a glassware forming machine that comprises the steps of:
   (a) storing in memory at least one profile of motion at said mechanism versus time, said profile being of a piecewise linear contour defined by a plurality of control points interconnected by line segments, each of said control points being defined by a time value and a corresponding motion value,
   (b) displaying time values of said control points to an operator,
   (c) under control of an operator, selectively altering the time value for at least one of said control points,
   (d) automatically altering the motion value of said at least one of said control points in said motion profile according to predefined motion limit conditions,
   (e) automatically generating and storing a new profile for motion at said operating mechanism versus time according to said time and motion values altered in said steps (c) and (d), and having a piecewise linear contour as in said step (a), and
   (f) thereafter controlling motion at said operating mechanism according to said new profile stored in said step (e).

2. The method set forth in claim 1 comprising the additional steps of:
   (g) graphically displaying at a graphic display said at least one profile during said step (b), and
   (h) following said steps (c), (d) and (e), altering said profile displayed in said step (g) to show said new profile generated in said step (e).

3. The method set forth in claim 2 comprising the additional steps of:
   (i) under control of an operator, reversing said step (c), and
   (j) following said step (i), automatically reversing said step (d), (e) and (h) so as to return the display to that in said step (g).

4. The method set forth in claim 1 wherein said at least one profile of motion versus time comprises of profile of acceleration at said operating mechanism versus time.

5. The method set forth in claim 4 wherein time in said at least one profile is stored in units of operating degrees of said operating mechanism.

6. The method set forth in claim 5 wherein said operating mechanism comprises a sweepout mechanism, and wherein said operating degrees are in units of glassware forming machine degrees.

7. The method set forth in claim 1 wherein each said profile of motion versus time comprises a plurality of profile line segments each extending between a successive pair of said control points, each of said line segments being defined by a separate equation having coefficients such that acceleration, velocity and position at said operating mechanism are each equal at each said control point between successive profile line segments.

8. A method of controlling motion of a sweepout mechanism in an individual section of a glassware forming machine that comprises the steps of:

(a) storing in electronic memory at least one profile of acceleration versus time, said profile being of a piecewise linear contour defined by a plurality of profile control points interconnected by line segments, each of said control points having an associated acceleration value and time value, (b) selectively displaying said at least one motion profile and said control points on an operator display screen, (c) under control of an operator, altering the time value of at least one of said control points on said display screen, (d) automatically altering the acceleration value of said at least one of said control points so as to maintain said piecewise linear contour according to predefined limit conditions at said sweepout mechanism, (e) storing a new profile of acceleration versus time at said sweepout mechanism having said piecewise linear contour and having said control points altered in said steps (c) and (d), (f) determining and storing at least one profile of velocity and position versus time based upon said new profile of acceleration versus time, and (g) thereafter controlling motion at said sweepout mechanism according to one of said profiles stored in said steps (e) and (f).

9. The method set forth in claim 8 wherein said limit conditions in said step (d) include sweepout angle at maximum stroke.

10. The method set forth in claim 9 wherein said limit conditions in said step (d) further include maximum sweepout velocity.

11. The method set forth in claim 8 wherein said piecewise linear contour comprises a four-level trapezoidal motion having four levels of constant acceleration.

12. The method set forth in claim 8 wherein said piecewise linear contour is such as to obtain a predetermined sweepout velocity at a predefined position in the motion of the sweepout mechanism.

13. The method set forth in claim 8 for controlling motion of the sweepout mechanism through an advance stroke during which the sweepout mechanism advances glassware on a section deadplate onto a cross-conveyor, and a return stroke during which the sweepout mechanism returns from the conveyor to the deadplate, wherein said step (a) comprises the step of storing in electronic memory at least two profiles of acceleration versus time having differing profile line segments for controlling said advance stroke and identical profile line segments for controlling said return stroke.

14. The method set forth in claim 8 wherein time in said at least one profile is stored in units of glassware forming machine degrees.

15. The method set forth in claim 14 wherein each said profile of acceleration versus time includes a plurality of line segments each extending between a successive pair of said control points, each of said line segments being defined by a separate equation having coefficients such that acceleration, velocity and position at said sweepout mechanism are each equal at each said control point between successive profile line segments.

16. In an individual section glassware forming system that includes a plurality of operating mechanisms for performing cyclic motions, electronic control means for controlling cyclic motion of at least one of said operating mechanisms, which comprises:

means for storing a plurality of motion profiles for said at least one of said operating mechanisms, with each of said motion profiles comprising a data set of motion data versus time data of piecewise linear contour defined by a plurality of control points, each of said control points having associated motion and time values, means for selectively displaying one of said profiles as a table of time values for said control points, means for permitting an operator to change the time value of at least one of said control points, means for automatically recomputing the data set for said one of said profiles to provide a recomputed data set of motion data versus time data for said one of said profiles as a function of a change in time data at said at least one control point while maintaining said piecewise linear contour of said one of said profiles, and means for controlling operation of said at least one of said operating mechanisms as a function of said recomputed data set of motion data versus time data.

17. The system set forth in claim 16 wherein said means for automatically recomputing the data set of motion data versus time data includes means responsive to an operator change of a time value at a control point of said one of said profiles for automatically determining motion data at all of said control points for said one of said profiles according to prespecified limit conditions at said at least one of said operating mechanisms.

18. The system set forth in claim 16 wherein said at least one of said mechanisms comprises a sweepout mechanism for sweeping glassware at each section of said machine from a deadplate onto a cross-conveyor.

19. The system set forth in claim 18 wherein said time data is in units of glassware forming machine degrees.

20. The system set forth in claim 19 wherein each profile of said plurality of profiles consists of a plurality of profile line segments each extending between a successive pair of said control points, each of said segments being defined by a separate equation having coefficients such that acceleration, velocity and position at said at least one of said operating mechanisms are each equal at each said control point between successive profile line segments.

* * * * *